Oct. 10, 1933.     C. R. DUNCAN     1,929,679

LOCK

Filed Feb. 25, 1932     2 Sheets-Sheet 1

Inventor

C. Robert Duncan.

by Charles Allen

Attys.

Oct. 10, 1933.   C. R. DUNCAN   1,929,679
LOCK
Filed Feb. 25, 1932   2 Sheets-Sheet 2
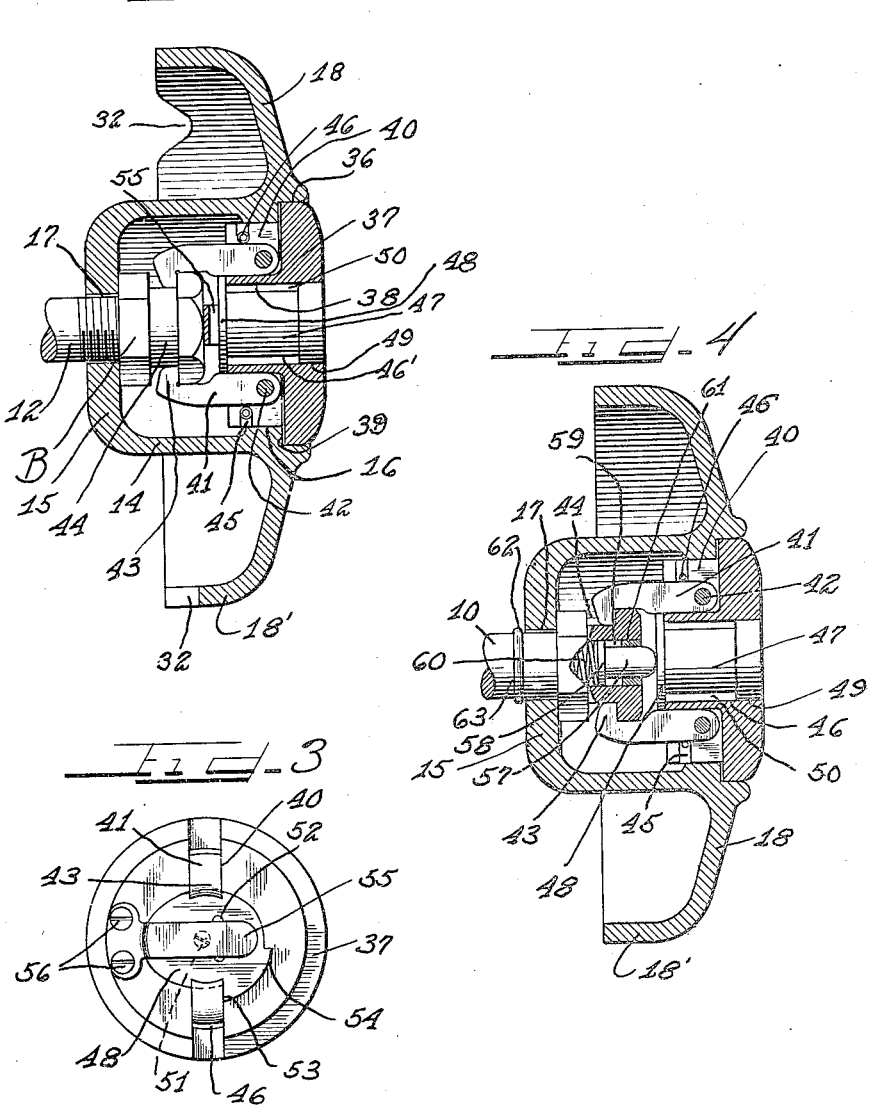
Inventor
C. Robert Duncan.
by Charles Hill
Attys.

Patented Oct. 10, 1933

1,929,679

UNITED STATES PATENT OFFICE 1,929,679

LOCK

Charles Robert Duncan, Waukegan, Ill., assignor to Oakes Products Corporation, North Chicago, Ill., a corporation of Michigan Application February 25, 1932. Serial No. 595,108

10 Claims. (Cl. 70—122)

My invention relates to securing structure comprising securing means such as a bolt having a head integral therewith or in the form of a nut threaded thereon and a housing for the bolt head with a closure for the housing held in place by key controlled members detachably interlocking with the bolt head.

An important object of the invention is to provide a housing, which may form part of a securing structure, for receiving a bolt head and having a passageway for the bolt shank, and having an opening through which the bolt head may be accessible by a wrench or other tool, and with a closure for such opening provided with key controlled grapples or dogs for interlocking engagement with the bolt head so as to lock the closure in closed position, the housing being rigidly held by the bolt head when turned to securing position.

On the drawings I have shown my improved structure applied to a carrier for supporting a spare wheel thereon, although it is to be understood that the invention could be adapted for other purposes.

On the drawings:

Figure 1 shows a carrier and spare wheel in diametral cross section and my improved lock protected securing means also in section;

Figure 2 is an enlarged diametral section of the lock structure and a bolt to which it is applied;

Figure 3 is an inner end elevation of the closure member for the housing; and

Figure 4 is a section similar to Figure 2 showing a modified arrangement.

On Figure 1 I have shown the securing means as comprising a bolt 10 having a rigid head 11 and a threaded shank for engagement with a supporting structure, while in Figure 2 the bolt 12 has a head in the form of a nut 13 for engaging the threaded outer end thereof, the outer end of the bolt shank being rigidly and permanently secured to a support. The protecting housing 14 shown is in the form of a cylindrical frame having the rear or inner wall 15 and the opening 16 opposite said wall. The wall 15 has the passageway 17 therethrough for receiving the shank of the securing bolt and the opening 16 permits access to the bolt head by a wrench or other tool for engaging with the sides of the head, the head shown being of hexagonal cross section.

The inner wall 15 of the housing may engage directly against a wall of a member to be supported, or, the housing may have abutting extensions for this purpose. Figure 1 shows the securing means applied for securing a spare wheel to a carrier structure and the housing is therefore provided with a flange 18 extending therefrom at its outer end and terminating in a cylindrical or annular end 18'. The carrier structure shown comprises a frame 19 of frusto-conical shape supported by suitable bracket means 20 from the rear or side of a vehicle, the frame 19 being closed at its front by a cross plate 21 secured thereto as by welding, which plate has a central opening 22 for receiving the inner end of the protecting housing 14. The bolt shank 10 which projects from the bolt head 11 within the housing has threaded engagement in a threaded lug 23 rigidly secured to the inner wall of the carrier frame 19. The end 18' of the abutment flange 16 on the housing abuts against the bolt flange or frame 24 secured within the outer or hub frame 25 of the spare wheel, this outer frame being connected by spokes 26 with the rim 27 which supports the tire 28. The bolt flange 24 has the central opening 29 through which the housing 14 extends for projecting through the opening 22 of the carrier structure and when the bolt is screwed up tight the abutment flange on the housing is clamped to the bolt flange 24 of the wheel and the wheel is rigidly secured to the carrier structure. On the wheel shown the bolt flange 24 has the cylindrical flange 30 surrounding the opening 29 and strengthening ribs 31 are formed between the flange body and the flange, and the rim 18' of the abutment flange 18 on the housing is therefore provided with notches 32 for receiving the ribs, the engagement of the ribs in these notches also serving to prevent rotation of the housing. The carrier may have a number of threaded studs 33 for projecting through bolt holes 34 in the bolt flange 24 of the wheel and to be received by nuts 35 to afford additional support for the wheel on the carrier.

At its outer end the housing 14 has the counterbore or annular recess 36 for receiving the head 37 of a closure plug 38, this head seating against the annular shoulder 39 at the base of the recess 36. Inside of the head 37 the cylindrical plug 38 has radial slots 40, two such slots being shown diametrically opposite. These slots receive the inner ends of the grappling fingers or levers 41 which are pivoted by means of pins 42 extending transversely through the slots. At their outer ends these fingers or levers have radially inwardly extending lugs 43 for engaging in the annular channel 44 formed in the head of the securing bolt as shown in Figure 1 or in Figure 2. The closure plug 38 has a circumferential channel 45 intersecting the slots 40 and this channel receives an elastic band or ring 46 which as shown in Figure 2 is in the form of a band or ring formed from a length of helical spring, and in the arrangement of Figure 4 is in the form of a split ring of elastic material such as steel wire. The elastic ring engages against the outer sides of the grapple fingers inwardly of their pivot axes and by its contraction tends to swing the fingers inwardly with their hook ends or lugs 43 in the channel of the bolt head so that the front faces of the hooks or lugs will abut against the section of the bolt head at the outside of the channel 44, the closure plug being thus held in the outer end of the housing to close the opening 16 and prevent access to the bolt head.

The closure plug has the axially extending cylindrical passageway 46' for receiving a lock cylinder 47 which at its inner end has secured thereto a cam plate 48. The head of the lock cylinder seats in a recess 49 at the outer end of the passageway 46 and the cam plate 48 abuts against the inner side of the closure plug so that the lock cylinder is secured against axial movement. The lock cylinder has tumblers therein (not shown) which when the key is withdrawn from the keyhole, will be projected radially outwardly into the longitudinally extending channels 50 so that the lock cylinder cannot be turned except by the insertion of the suitable key, and upon insertion of such key the tumblers will be drawn inwardly so that the lock cylinder may be rotated.

The cam plate 48 may be secured to the end of the lock barrel by a screw 51 assisted by pins 52 extending therethrough from the barrel. The cam disc is of oval shape and when its minor axis is presented between the fingers 41 the fingers will be free to be swung by the elastic band 46 to project their ends 43 into the channel of the bolt head or nut after the plug has been inserted in the opening 16 of the housing. The inner ends of the fingers are beveled as shown so that when the closure plug is applied in the opening 16 the fingers will be cammed outwardly by the engagement of their beveled ends with the bolt head and then when the plug is in closing position the elastic band 46 will swing the fingers inwardly to interlock with the bolt head. When it is desired to withdraw the closure plug the key is inserted in the keyhole of the lock cylinder and the key is turned to rotate the cam disc 90° to present its major axis between the fingers and such rotation of the disc will cause the fingers to be cammed and swung radially outwardly to release their ends 43 from the bolt head and the closure plug can then be withdrawn from the housing. To guide the turning of the key for the proper positioning of the cam disc abutment shoulders 53 and 54 are provided on the disc for abutting against the sides of the respective fingers to stop further movement of the cam disc after it has been swung to present either its major or minor axis between the fingers.

To prevent rattling of the closure plug, as for example when the securing structure is used on a motor vehicle, I have shown a flat spring 55 interposed between the cam disc and the bolt head as shown in Figures 1, 2, and 3, this spring being secured at one end by screws 56 to the end of the plug with its free end extending across the disc so that when the closure plug is inserted the spring will be compressed and the plug will then be pressed outwardly to hold the ends 43 of the fingers firmly against the bolt head and thus prevent rattling of the fingers or of the plug. In the arrangement shown the plug is free to rotate after it has been interlocked with the bolt head but the spring 55 will create enough friction against turning so that the plug will be held while the key is turned in the lock to release the fingers from interlocking engagement with the bolt head.

In the arrangement of Figure 4 the anti-rattle means may comprise a plunger 57 having a head 58 at its inner end for engaging in the cylindrical pocket 59 formed in the bolt head, a compression spring 60 being interposed between this head and the bottom of the pocket tending to push the plunger outwardly, the bushing 61 secured in the outer end of the pocket guiding the plunger. When the lock plug is inserted in the end of the housing 14 the plunger will be abutted by the end of the lock cylinder and will be shifted inwardly against the force of the spring 60 and the various parts will then be secured against rattling.

Where the securing structure comprises a bolt whose rigid head is received by the housing 14, the bolt and housing may be coupled together as by means of a split spring ring 62 applied in the circumferential notch 63 in the bolt shank just outside of the housing. The bolt will thus be held to the housing and cannot be displaced therefrom but can be readily rotated when the securing structure is applied to a support and object to be supported.

The engagement of the abutment extension or flange 18 of the housing against a support or an object secured to the support will prevent rotation of the housing structure in an attempt to loosen the bolt or nut. The head 37 of the closure plug also seats well within the recess 36 and its outer corner is rounded so that there is no chance of getting a hold on the head for inserting a tool between the head and the housing for the purpose of surreptitiously removing the closure plug to get at the bolt head within the housing. The bolt is thus well guarded against tampering and theft of the object which is secured to a support.

I have shown a practical and efficient embodiment of the various features of my invention but I do not desire to be limited to the exact construction and arrangement shown and described as changes and modifications may be made without departing from the scope of the invention as defined by the appended claims.

I claim as my invention:

1. In combination, a bolt having a head, a housing for enclosing the head or nut having a wall for application under the head whereby said housing is secured when the head is turned, said housing having an opening for the insertion of tools for turning said head, a closure for said opening, abutments on the bolt head, grapple fingers pivoted on said closure and means for moving said fingers into interlocking engagement with said abutment when said closure is applied, and key controlled means for withdrawing said fingers from said abutments.

2. In combination, a bolt having a head, a housing for enclosing said head or nut and having a wall for application under the head whereby the housing is secured when the head is turned, said housing having an opening for the insertion of a tool for application to the head to turn the same, a closure for said opening, said head having abutments, grapple fingers pivoted at their outer ends on said closure and having lugs at their inner ends, yielding means tending to swing said fingers to bring their lugs into interlocking engagement with said abutments whereby to lock said closure to the housing, a lock cylinder in said closure operable by a key, and a cam member movable by said housing to engage said fingers to cause unlocking thereof from the head whereby said closure is released for removal.

3. In combination a bolt having a head, a housing for enclosing said head or nut and having an opening for passage of the bolt, said housing having an opening for the insertion of a tool for engagement with the bolt head, a closure for said opening, grapple fingers pivoted on said closure and having abutment lugs at their inner ends, abutments on said head, an elastic member surrounding said fingers to swing them inwardly to carry their abutment lugs behind the abutments on said head when said closure member is applied whereby said closure member will be locked to close said opening, and key controlled means on said closure operable to swing said fingers away from the abutments on said head whereby said closure may be withdrawn from the housing opening.

4. In combination, a bolt having a head, a housing for enclosing said head or nut and having an opening in its inner wall for passage of the bolt whereby said wall will be engaged by the head when the head is turned, said housing having an opening for the insertion of a tool for engaging said head, a closure for said opening, said head having a circumferential groove, grapple fingers pivoted at their outer ends on said closure and having abutment lugs on their inner ends, means for swinging said fingers inwardly to project their lugs into said groove when said closure is applied to said opening whereby said fingers and head will be interlocked to hold said closure in closing position, and key operable cam means on said closure for swinging said fingers clear of said head for withdrawal of said closure from said opening.

5. In combination, a bolt having a head provided with abutments, a housing for enclosing the head and having a wall provided with an opening for passage of the bolt shank and forming a seat for the bolt head, said housing having an opening for the insertion of a tool for engaging said bolt head, a closure member having a cylindrical part for engaging in said opening to close the same, said plug having radial slots, grapple fingers engaging in and pivoted at their outer ends said slots, a circumferential channel in said plug and an elastic ring in said channel engaging against the outer sides of said fingers to swing them into interlocking engagement with the bolt head groove whereby to lock the closure in closing position, a lock cylinder rotatable in said closure and operable by a key, and a cam disc on the inner end of said lock cylinder adapted when rotated by said cylinder to swing said fingers outwardly clear of the head whereby said closure may be withdrawn.

6. A washer structure for application under a bolt head having an opening for receiving the bolt shank, walls forming a housing for enclosing the head of the bolt, said housing having an opening for insertion of a tool for application to the head of the bolt for turning thereof, a closure plug for said opening, grapple fingers pivoted on said plug, yielding means on said plug for swinging said fingers into interlocking engagement with abutments on the head of the bolt, a lock cylinder in said plug, and a cam on said lock cylinder operable thereby to swing said fingers clear of the head to release said plug for withdrawal from said opening.

7. A washer structure for a bolt head having an abutment, said washer structure having a hole for passage of the bolt shank and having a wall forming a housing for enclosing the bolt head, said housing having an opening for the insertion of a tool for engagement with the bolt head, a closure plug for said opening having radial slots, grapple fingers engaging at their inner ends in said slots and being pivoted for radial swing, abutment lugs on the ends of said fingers for engaging with the bolt head abutment when the closure plug is applied, a spring ring surrounding said fingers and tending to swing them inwardly to hold them in interlocking engagement with the bolt head, a key controlled lock cylinder in said plug, and a cam operable by said lock cylinder to swing said fingers clear of the bolt head to free said plug for withdrawal from said opening.

8. A washer structure for a bolt head having a hole for receiving the bolt shank and having a wall forming a housing for enclosing the bolt head, said housing having an opening for the insertion of a tool for engaging the head, a closure plug for said opening, a hook pivoted on said plug and extending axially inwardly therefrom and adapted for interlocking engagement with abutments on the head whereby to hold the closure plug in closing position, a spring tending to hold the hook in interlocking engagement, and a key operable cam member on said plug for releasing said hook from the head.

9. In a lock structure, a housing for enclosing the head of a bolt and having a wall for application under the head to be thereby secured when the bolt is tightened, said housing having an opening for the insertion of a tool for engaging said head, a closure for said opening, abutments on the head of the bolt which secures the housing, latch fingers pivoted on said closure and a spring band tending to hold said fingers for interlocking engagement with the abutments when said closure is applied to close said opening, and means for releasing said fingers from said abutments.

10. In combination, a bolt having a head, a housing for enclosing said head and having a wall for application under said head whereby the housing may be secured when the bolt is tightened, said housing having an opening for the insertion of tools for engaging said head, a closure for said opening, abutments on said bolt head, and grapple fingers on said closure and a spring band surrounding and engaging said fingers and tending to interlockingly connect them with said abutments when said closure member is applied, and means on said closure operable to disengage said fingers from said abutments whereby to release said closure.

C. ROBERT DUNCAN.